Aug. 12, 1958   CARLOS SAURET PONSA   2,846,939
APPARATUS FOR PREPARING INFUSIONS
Filed Nov. 9, 1956   2 Sheets-Sheet 1

Inventor
C. Sauret Ponsa
By Glascock Downing & Seebold
Attys

Aug. 12, 1958    CARLOS SAURET PONSA    2,846,939
APPARATUS FOR PREPARING INFUSIONS
Filed Nov. 9, 1956    2 Sheets-Sheet 2

Inventor
C. Sauret Ponsa
By Glascock Downing Seebold
Attys

United States Patent Office 2,846,939
Patented Aug. 12, 1958

2,846,939

APPARATUS FOR PREPARING INFUSIONS

Carlos Sauret Ponsa, Barcelona, Spain

Application November 9, 1956, Serial No. 621,454

Claims priority, application Spain November 19, 1955

4 Claims. (Cl. 99—302)

This invention relates to an improved apparatus for preparing infusions of coffee, tea or similar substances, by air pressure, and, more particularly, to the combination of a coffee, or other substance, holding filtering container with its hermetic sealing means, a support for said container, mechanically operated air injecting means in communication with said container, and means for detachably connecting and securing said sealing means, with uniform pressure, on said container.

It is an object of the present invention to provide an apparatus for preparing infusions of coffee, tea or similar substances, for domestic use, by air pressure, which is simple, reliable and of a relatively small size, but, at the same time, which makes it possible to obtain a reasonable number of individual portions of good infusion in only one operation, thus avoiding the trouble and the loss of time involved in carrying out successive operations to obtain one or two portions of infusion in each operation.

It is a more specific object of the invention to use mechanical means manually operated to compress an elastically deformable ball placed on top of the cover of a filtering container for producing infusions and in communication therewith, said mechanical means comprising a compressing plate pivotally connected to said cover and provided with an arm for operation thereof, thus regularly obtaining the full outlet of the air contained within said ball with a small effort, and at the same time to provide such ball with means for rapidly recovering its normal shape when relieved from external pressure. There is thus insured a quick passage of the hot liquid through the ground coffee, or other substance, with a minimum temperature drop, which is essential to obtain a good infusion. Furthermore, the deterioration of said ball is also reduced to a minimum.

It is another object of the invention to provide, in an apparatus for making infusions of coffee, tea or similar substances, the compressing grid with a substantially vertical rod furnished with clear signals showing the level corresponding to a successive number of portions of infusion, said rod being also helpful in handling said grid.

Another object of the invention is to provide an apparatus for making infusions of coffee, tea or similar substances, by air pressure, furnished with means for reducing the cooling down of the liquid in the container during the period of infusion comprising an outer casing surrounding said container.

It is still another object of the invention to provide means for freely placing a receptacle for collecting the infusion under the outlet hole and preferably on an insulating base. The apparatus thus constructed can be placed on valuable furniture.

Finally, it is another object of the invention to provide simple, easy handled and secure means for detachably connecting and securing the sealing means to the container with uniform pressure, thus obtaining a reliable hermetic sealing of an apparatus for making infusions.

The above and other objects of the invention will become apparent from the following detailed description, in which reference is made to the accompanying drawings, in which.

Figure 1:
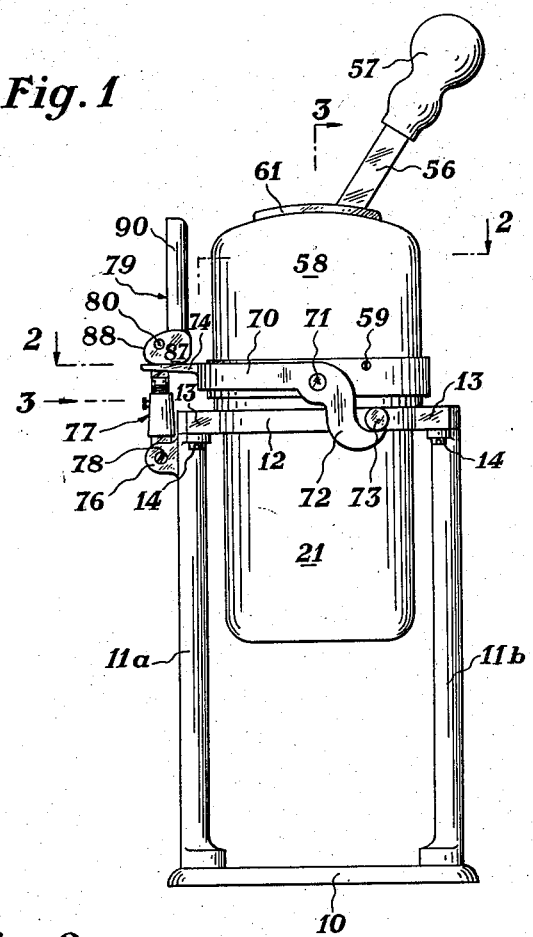
Figure 1 is a side view of an embodiment of the apparatus of the invention.
Figure 2:
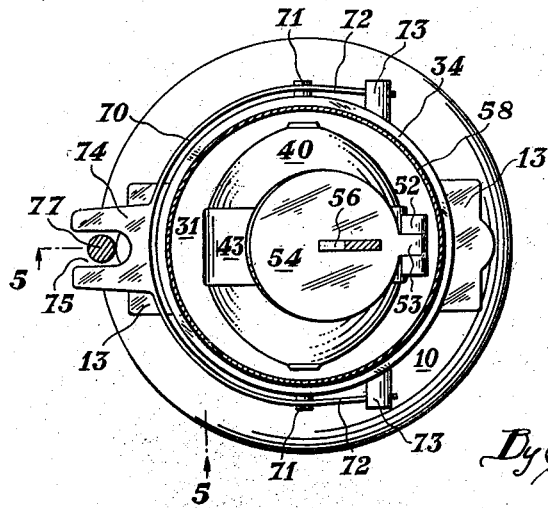
Figure 2 is an enlarged top plan view of the apparatus shown in Figure 1 partially sectioned along line 2—2.
Figure 3:
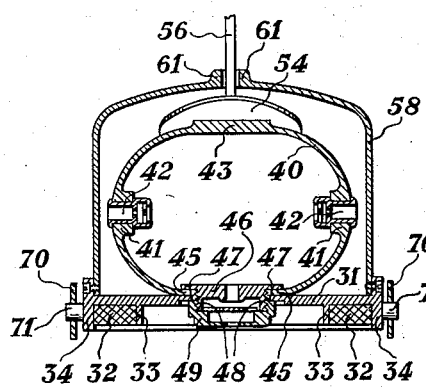
Figure 3 is an enlarged sectional view along line 3—3 of Figure 1.

With reference to the drawings, the reference numeral 10 denotes a base, preferably insulating, on which are fixed two diametrically opposite columns 11a and 11b. A supporting ring 12 rests on said columns 11a and 11b by means of shoulders 13 fastened down with screws 14, and said supporting ring 12 has in its inner face a circular groove 15 and a stepped circular recess 16. The length of said columns 11a and 11b is such that it is possible to place freely on said base 10 a suitable receptacle for collecting the infusion.

Said circular groove 15 is fitted to receive a circular flange 20 provided in an outer casing 21 near its upper edge, said outer casing having in its bottom 22 a wide opening 23 for the passage of the infusion. The outer casing 21 surrounds a coffee, or other substance, holding filtering container 24, which rests, by the lower face of an outwardly directed circular projection 25 provided on the upper edge of said container, on the stepped circular recess 16 of the supporting ring 12. The bottom 26 of said container slopes slightly down to a central hole 27 in order to facilitate the outlet of the infusion through said hole 27. Said container 24 is adapted to receive in its interior a compressing grid 28 which holds down the ground coffee, or tea, or similar substance, said grid 28 being provided with a substantially vertical rod 29 having collars 30a to 30e showing the level corresponding respectively to one to five portions of infusion.

A disc 31 acting as a hermetic sealing means of the container 24 is applied on the upper edge thereof by means of an elastic circular tight joint 32, embedded between a circular projection 33, provided in the lower face of said disc 31, and a clamping ring 34 positively connected with said disc 31, so that said joint 32 is not dislodged when said disc is detached from said container. The disc 31 has, in its upper face and near the periphery, a projecting block 35, and is provided with a central hole.

The air injecting means comprise an elastically deformable ball 40 in the form of a prolate ellipsoid, which has in it poles tubules 41 in which air inlet valves 42 are lodged and, in order to promote its quick recovery, is provided in its central portion and along its equator with a thicker band 43, which has its thickest zone 44 on the mid upper side, gradually loses thickness on both sides and is substantially of the same thickness as the rest of the ball in its lower zone 45. In said zone 45 is provided a hole with an air outlet valve 46 lodged therein, said valve 46 meeting with and passing through the central hole in the disc 31 so that said ball 40 is in communication with the container 24 by means of said outlet valve 46. Furthermore, said valve 46 helps to fix the air injecting ball 40 to the disc 31 by means of a circular flange 47 which, in co-operation with said disc 31 sandwiches the zone 45 of said air injecting ball 40 surrounding said valve 46, said valve 46 having a downwardly directed threaded extension 48 which projects beyond the lower surface of the disc 31 through its central hole, to which extension 48 is screwed a centrally pierced nut 49, which strongly fastens the valve 46 and the air injecting ball 40 to the disc 31.

To compress the elastically deformable air injecting ball 40 a manually operated mechanical means has been provided, which is described below. On the projecting block 35 provided in the disc 31 a flat elongated piece 50 has been fixed by means of screws 51, and on the reinforced upper edge 52 of said piece 50 a rectangular flat extension 53 of a compressing plate 54 has been pivoted by means of a pin 55. Said compressing plate 54 is applied against the elastically deformable air injecting ball 40 and has an arm 56 provided with a handle 57 which, when manually operated, causes the compressing of the ball 40 and, consequently, the passage of the air contained in its interior into the container 24 through the air outlet valve 46. An outer casing 58 is attached to the clamping ring 34 by means of the screws 59, said outer casing 58 being provided on its top with an elongated window 60 with reinforced edges 61, through which window emerges said arm 56 of the compressing plate 54. The longer sides of said window 60 are disposed perpendicularly to the longitudinal axis of the pin 55, thus permitting the movement of the arm 56 along said window 60, the shorter reinforced sides 61a and 61b of which act as a stop to said arm 56 in its extreme positions.

In order to obtain a uniform pressure of the disc 31 on the upper edge of the container 24, a connecting and securing means has been provided comprising a fork 70 mounted on diametrically opposite pivots 71 provided in the clamping ring 34. The ends of the two arms of said fork 70 are downwardly folded and form hooks 72 which engage two cylindrical projections 73 provided in the supporting ring 12. Opposite to said two arms, the fork 70 has a flat extension 74 with a deep central recess 75. The column 11a has, near its upper end, two lugs 76 on which is pivoted one of the ends of an adjustable member 77 by means of a pin 78, while said adjustable member 77 is pivotally connected by its other end to a locking lever 79 by means of pin 80. The adjustable member 77, which is substantially cylindrical and adapted to engage in the recess 75, comprises a rod 81 with a threaded portion 82 and a hollow part 83, the threaded inner surface 84 of which is arranged to receive the threaded portion 82 of the rod 81, which results in the length of said member 77 being adjustable. In order to avoid any movement of the two threaded parts of said member 77 a longitudinal groove 85 has been provided in said rod 81 and a screw 86 has been arranged in a threaded hole of the wall of the hollow part 83 which is adapted to penetrate into said groove 85 of the rod 81 thus preventing any movement thereof. The locking lever 79 has a body 87, provided with a cam flank 88 and a flat zone 89, and a handle 90 adapted to impart to the locking lever 79 a rotating movement round the pin 80.

Figure 4:
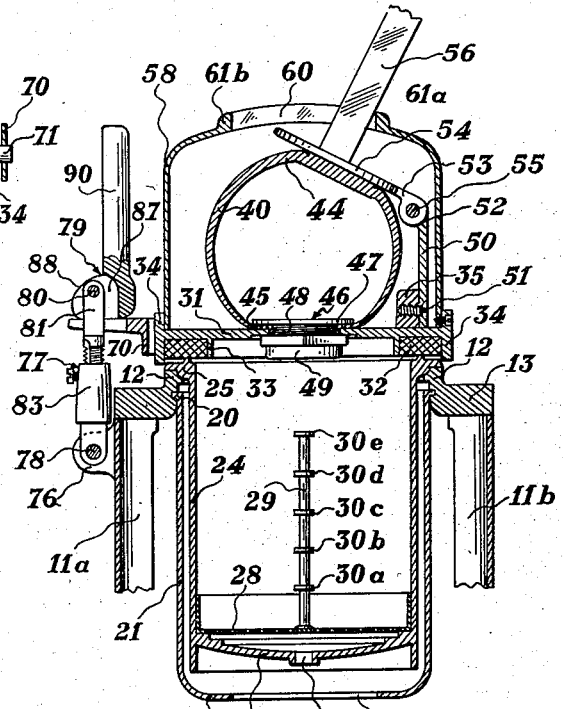
Figure 4 is an enlarged diametrical sectional view of the apparatus shown in Figure 1 in which the base and part of the columns have been excluded.
Figure 5:
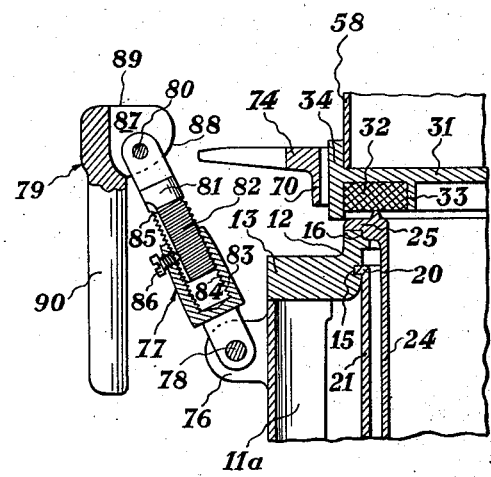
Figure 5 is a much enlarged sectional fragmentary view of the apparatus shown in Figure 1 along line 5—5 of Figure 2, in which the means for connecting and securing the sealing means to the container is partially shown.

The manner of using an apparatus for preparing infusions of coffee, tea or similar substances, according to the above description will be clear from a consideration of Figures 1, 4 and 5. With the disc 31 detached from the container 24, said container is charged with ground coffee, tea or a similar substance, in the usual way, then the compressing grid 28 is placed on said substance and boiling liquid is poured into the container up to the level corresponding to the number of portions of infusion which it is desired to obtain as indicated by collars 30a—30e on rod 29. Then the disc 31 is placed on the container 24 so that the joint 32 bears on the upper edge of said container 24 and that the hooks 72 engage the cylindrical projections 73 in consequence of the movement of the fork 70 round the pivots 71. The member 77 is raised to engage with the recess 75 of the flat extension 74 (as shown in Figure 5) and thereupon the locking lever 79 is placed above said flat extension 74 with the handle 90 downwardly directed (as shown in Figure 5). Then said locking lever 79 is caused to turn by raising the handle 90, the cam flank 88 thus pressing on the upper face of the flat extension 74, which results in the joint 32 pressing on the upper edge of said container 24 and, consequently, in a hermetic sealing of the container, the said pressure being adjustable by means of the adjustable member 77. When the handle has reached a substantially vertical position (as shown in Figures 1 and 4), the locking lever is bearing, by its flat zone 89, on the flat extension 74 and has therefore assumed a stable position which secures the sealing of the container 24. The arm 56 is then moved by its handle 57 and is smoothly compelled to progress along the window 60 from 61a to 61b thus causing the compressing of the elastically deformable air injecting ball 40, which results in the delivery of the air contained in said ball 40 through the air outlet valve 46 into the container 24. By repeating several times said movement of the handle 57 the boiling liquid is forced to pass through the ground coffee, or tea, or similar substance, and the infusion discharges through the hole 27 in the container 24 and through the opening 23 in the outer casing 21 into a suitable receptacle (not shown in the drawings) disposed below said container 24 and on the base 10. Once the infusion has been obtained, the locking lever 79 is forced to turn by lowering the handle 90 and the adjustable member 77 is disengaged from the recess 75 in a reverse movement to that shown in Figure 5, the fork 70 is caused to turn slightly on pivots 71 in order to disengage the hooks 72 from the cylindrical projections 73 and the disc 31 is detached from the container 24. Then the container is taken off the supporting ring and the washing of the container and of the compressing grid can be done easily thus leaving the apparatus prepared for the next operation.

While an embodiment of the apparatus according to the invention has been illustrated and described, it is intended that all matter contained in the above description or shown in the accompanying drawings shall be interpreted as illustrative and not in a limiting sense.

I claim:

1. In an apparatus for preparing infusions of coffee, tea or similar substances, by air pressure, the combination of a substance holding filtering container having in its interior a free compressing grid, a disc acting as a hermetic sealing means of said container, said disc being provided with a central hole, means of support comprising a supporting ring adapted to hold up said container and means for sustaining said supporting ring at such a height that it is possible to place freely below said container a suitable receptacle for collecting the infusion, air injecting means comprising an elastically deformable ball having a central thicker band which promotes its quick recovery on release of external pressure, said ball being provided with two air inlet valves and one air outlet valve, the latter being located in the lowest part of said ball and meeting with and passing through said central hole in the disc, said air outlet valve helping to fix the said ball to the said disc, a compressing plate pivotally connected to said disc and applied against said ball, an arm fixed to said compressing plate and adapted to be manually operated, which causes, on operation, the regular compressing of the ball by the compressing plate and, consequently, the passage of the air contained in said ball through said air outlet valve into the container, and means for detachably connecting and securing said disc to said container with uniform pressure.

2. In an apparatus for preparing infusions of coffee, tea or similar substances, by air pressure, the combination of a substance holding filtering container having in its interior a free compressing grid, said container being surrounded by an outer casing having in its bottom an opening to permit the discharge of the infusion, a disc acting as a hermetic sealing means of said container, said disc being provided with a central hole, means of support comprising a supporting ring adapted to hold up said container and means for sustaining said supporting ring at such a height that it is possible to place freely below said container a suitable receptacle for collecting the infusion, air injecting means comprising an elastically deformable ball having a central thicker band which promotes its quick recovery on release of external pressure, said ball being provided with two air inlet valves and one air outlet valve, the latter being located in the lowest part of said ball and meeting with and passing through said central hole in the disc, said air outlet valve helping to fix the said ball to the said disc, a compressing plate pivotally connected to said disc and applied against said ball, an arm fixed to said compressing plate and adapted to be manually operated, which causes, on operation, the regular compressing of the ball by the compressing plate and, consequently, the passage of the air contained in said ball through said air outlet valve into the container, and an outer casing above said disc, provided with an elongated window through which said arm emerges, said window being arranged so as to permit the movement of said arm and to provide a stop to said arm in its extreme positions, and means for detachably connecting and securing said disc to said container with uniform pressure.

3. In an apparatus for preparing infusions of coffee, tea or similar substances, by air pressure, the combination of a substance holding filtering container having in its interior a free compressing grid, said container being surrounded by an outer casing having in its bottom an opening to permit the discharge of the infusion, a disc acting as a hermetic sealing means of said container, said disc being provided with a central hole, means of support comprising a supporting ring adapted to hold up said container, a plurality of columns on which said supporting ring is mounted and a base on which said columns are fixed, the length and disposition of said columns being such that it is possible to place freely below said container and on said base a suitable receptacle for collecting the infusion, air injecting means comprising an elastically deformable ball having a central thicker band which promotes its quick recovery on release of external pressure, said ball being provided with two air inlet valves and one air outlet valve, the latter being located in the lowest part of said ball and meeting with and passing through said central hole in the disc, said air outlet valve helping to fix the said ball to the said disc, a compressing plate pivotally connected to said disc and applied against said ball, an arm fixed to said compressing plate and adapted to be manually operated, which causes, on operation, the regular compressing of the ball by the compressing plate and, consequently, the passage of the air contained in said ball through said air outlet valve into the container, and an outer casing above said disc, provided with an elongated window through which said arm emerges, said window being arranged so as to permit the movement of said arm and to provide a stop to said arm in its extreme positions, and means for detachably connecting and securing said disc to said container with uniform pressure.

4. In an apparatus for preparing infusions of coffee, tea or similar substances, by air pressure, the combination of a substance holding filtering container having in its interior a free compressing grid, said container being surrounded by an outer casing having in its bottom an opening to permit the discharge of the infusion, a disc acting as a hermetic sealing means of said container, said disc being provided with a central hole, means of support comprising a supporting ring adapted to hold up said container, a plurality of columns on which said supporting ring is mounted and a base on which said columns are fixed, the length and disposition of said columns being such that it is possible to place freely below said container and on said base a suitable receptacle for collecting the infusion, air injecting means comprising an elastically deformable ball having a central thicker band which promotes its quick recovery on release of external pressure, said ball being provided with two air inlet valves and one air outlet valve, the latter being located in the lowest part of said ball and meeting with and passing through said central hole in the disc, said air outlet valve helping to fix the said ball to the said disc, a compressing plate pivotally connected to said disc and applied against said ball, an arm fixed to said compressing plate and adapted to be manually operated, which causes, on operation, the regular compressing of the ball by the compressing plate and, consequently, the passage of the air contained in said ball through said air outlet valve into the container, and an outer casing above said disc, provided with an elongated window through which said arm emerges, said window being arranged so as to permit the movement of said arm and to provide a stop to said arm in its extreme positions, and means for detachably connecting and securing said disc to said container, said means comprising a locking lever having a cam flank, pivotally connected to the means of support by an adjustable member, a disc surrounding clamping ring having two diametrically opposite pivots, a two-armed fork pivoted thereon, the two arms of said fork being adapted to engage by their ends two cylindrical projections provided in the supporting ring and said fork having, opposite to said arms, a flat extension adapted to receive said adjustable member of the locking lever and to be downwardly pressed by the cam flank of said locking lever when the latter is operated to effect a connecting and securing operation.

References Cited in the file of this patent

UNITED STATES PATENTS

| | | |
|---|---|---|
| 41,974 | Class et al. | Mar. 22, 1864 |
| 299,198 | Bradford et al. | May 27, 1884 |
| 373,420 | Suits | Nov. 15, 1887 |
| 596,285 | Carter | Dec. 28, 1897 |

FOREIGN PATENTS

| | | |
|---|---|---|
| 618,327 | France | Dec. 13, 1926 |
| 674,076 | France | Oct. 19, 1929 |